United States Patent [19]

Wood

[11] Patent Number: 4,720,254
[45] Date of Patent: Jan. 19, 1988

[54] SCREW EXTRUDERS

[75] Inventor: Kenneth Wood, Norden, England

[73] Assignee: Farrel Corporation, Ansonia, Conn.

[21] Appl. No.: 881,131

[22] Filed: Jul. 2, 1986

[30] Foreign Application Priority Data

Jul. 16, 1985 [GB] United Kingdom ............. 8517864

[51] Int. Cl.$^4$ ............................................. B29C 47/38
[52] U.S. Cl. ..................... 425/208; 241/260.1; 366/90
[58] Field of Search ........... 425/188, 197, 208, 376 R, 425/376 A, 376 B; 415/72, 74; 366/80, 90, 87; 416/176, 177; 241/260.1

[56] References Cited

U.S. PATENT DOCUMENTS

| | | | |
|---|---|---|---|
| 2,838,794 | 6/1958 | Munger et al. | 241/260.1 X |
| 3,023,455 | 3/1962 | Geier et al. | 425/208 |
| 3,367,635 | 2/1968 | Gresch | 366/90 X |
| 3,368,724 | 2/1968 | Peters et al. | 415/72 X |
| 3,487,503 | 1/1970 | Barr et al. | 425/208 |
| 3,814,563 | 6/1974 | Slaby et al. | 425/208 X |
| 3,884,451 | 5/1975 | Stenmark et al. | 416/176 X |
| 3,913,897 | 10/1975 | Hanslik | 415/72 X |
| 3,981,658 | 9/1976 | Briggs | 425/208 X |
| 4,178,104 | 12/1979 | Menges et al. | 366/80 |
| 4,280,802 | 7/1981 | Lang et al. | 425/208 |
| 4,304,054 | 12/1981 | Nauck | 366/87 X |
| 4,581,992 | 4/1986 | Koch | 366/90 X |
| 4,629,326 | 12/1986 | Huls | 366/80 |
| 4,629,327 | 12/1986 | Capelle | 366/90 X |

FOREIGN PATENT DOCUMENTS

| | | |
|---|---|---|
| 1440682 | 6/1976 | United Kingdom . |
| 2068249 | 8/1981 | United Kingdom . |
| 2150037 | 6/1985 | United Kingdom . |

Primary Examiner—Richard L. Chiesa
Attorney, Agent, or Firm—Parmelee, Bollinger & Bramblett

[57] ABSTRACT

A screw extruder comprises a barrel (10) having a chamber (12) in which a screw (14) is mounted for rotation about an axis A. Sets of pins (22) project from the barrel into annular zones (24), (25) of the chamber (12), interrupting flights (26), (28), (30), (32) of the screw. The flights at either side of the, or each, annular zone (24) are displaced angularly relative to one another so that at either side of each annular zone (24) the flights are staggered. End portions of adjacent flights at either side of each annular zone (24) overlap. Material processed may have less temperature variation and improved homogeneity compared with material processed by previously known extruders.

2 Claims, 2 Drawing Figures

SCREW EXTRUDERS

FIELD OF THE INVENTION

This invention is concerned with screw extruders, especially screw extruders suitable for use in processing thermoplastics or elastomeric materials.

BACKGROUND OF THE INVENTION

In processing thermoplastics and elastomeric materials it is necessary to ensure that such materials are adequately mixed and homogenized. Various means have been proposed for improving mixing and homogenization: for example U.K. Pat. No. 1 440 682 describes an extruder for homogenising viscous materials e.g. rubber materials, in which a screw rotatable in the melt chamber has interrupted helical flights, with obstacles projecting from the sides of the chamber arranged to cooperate with the flights of the screw. A different approach to mixing is described in U.S. Pat. No. 3 884 451 in which is disclosed a mixing screw having a succession of spaced apart discontinuous helical flights, each successive flight being centred in a channel between preceding flights so that material flowing through the extruder is split into a plurality of streams which are mixed with one another. British Pat. No. 2 068 249 is also concerned with a screw extruder by which materials may be mixed and homogenized and effects mixing and homogenization by means of both projections into the melt chamber in the form of pegs, similar to the obstacles used in British Pat. No. 1 440 682 and staggered flights generally similar to those shown in U.S. Pat. No. 3 884 451. In British Pat. No. 2 068 249 end faces of the screw flights between which the obstacles (pegs) fixed to the cylinder pass on rotation of the screw, face one another and are substantially directly opposite one another when considered in a direction axially of the screw.

Although extruders as described in these three specifications provide significant improvement in mixing and homogenization over extruders with a plain screw thread without any additional means for improving homogenization and mixing, nevertheless mixing and homogenization can be yet further improved.

One of the objects of the present invention is to provide an improved screw extruder.

SUMMARY OF THE INVENTION

A screw extruder embodying the invention comprises a barrel having a melt chamber extending therethrough, a screw mounted for rotation in the melt chamber and comprising a plurality of helical flights with channels therebetween, and at least one set of projections projecting from the barrel towards an axis of rotation of the screw into an annular zone of the melt chamber (around a core of the screw) and interrupting the flights of the screw. The projections may comprise a number of so-called pegs or pins set in the wall of the barrel or mounted for movement inwardly and outwardly of the melt chamber towards and away from the axis of rotation of the screw so that the projections may project a desired distance into the melt chamber to give the desired processing to material being extruded. The projections may be provided by other means, for example as projections from a plate secured between adjacent modules of the barrel as described in our copending patent application No. 8331653 (publication No. 2 150 037). A screw extruder according to the invention may comprise one or more annular zones formed by projections from the barrel, dividing the screw into two or more sections. Material is preferably fed to the chamber through an opening in the barrel wall at an inlet end portion of the extruder; the screw at the inlet end portion comprises uninterrupted screw flights, the, or the first, annular zone being positioned downstream of the inlet end portion of the extruder. Where an extruder according to the invention comprises more than one annular zone, the annular zones may be positioned at any desired portion of the extruder downstream of the feed zone; however, preferably a sufficient length of extruder screw is positioned downstream of the final annular zone to generate a substantially steady discharge from the extruder.

The screw flights of an extruder according to the invention may be displaced, at either side of the or each annular zone angularly relative to one another so that the screw flights at either side of the (or each) annular zone are staggered. Preferably the flights at either side of an annular zone are so disposed that, were the flights from one side of the annular zone to be continued at the other side of the annular zone, the screw flight at that other side of the annular zone would lie substantially centrally of the channel formed between the two continued flights. The construction and arrangement of an extruder embodying the invention may be such that end portions of adjacent flights at either side of an annular zone overlap one another considered in a direction longitudinally of the screw parallel with its axis. Preferably the end portion of each flight terminates at its adjacent annular zone in an end face lying in a plane substantially at right angles to the axis of rotation of the screw and said faces of adjacent flights at either side of an annular zone are disposed so that they do not face one another, the faces being displaced angularly, relative to one another, round the axis of the screw so that end portions of the helical flights overlap one another when considered in a direction parallel with the screw axis. The end faces of each flight at either side of an annular zone are positioned so that, considered in a direction parallel with the screw axis, each end face is at least partially and preferably wholly opposite a helical face of a screw flight at the opposite side of the annular zone. Material flowing along the channels between the flights in the operation of an extruder according to the invention will be subjected to shear, inter alia, between the end portion of the flights adjacent the annular zones and the projections. The amount of angular displacement of the sets of flights at either side of an annular zone may, together with the helix angle, effect the amount of shear to which the material is subjected. The annular displacement of the flights at either side of an annular zone relative to one another results in flow of material along the screw being divided as the material crosses the annular zone thus increasing the multi-layering of the material leading to reduced temperature variation and better homogeneity of the material.

There now follows a detailed description to be read with reference to the accompanying drawings of a screw extruder embodying the invention. It will be realized that this extruder has been selected for description to illustrate the invention by way of example and that the invention may reside in any novel feature or combination of features described.

DETAILS OF THE INVENTION

Figure 1:
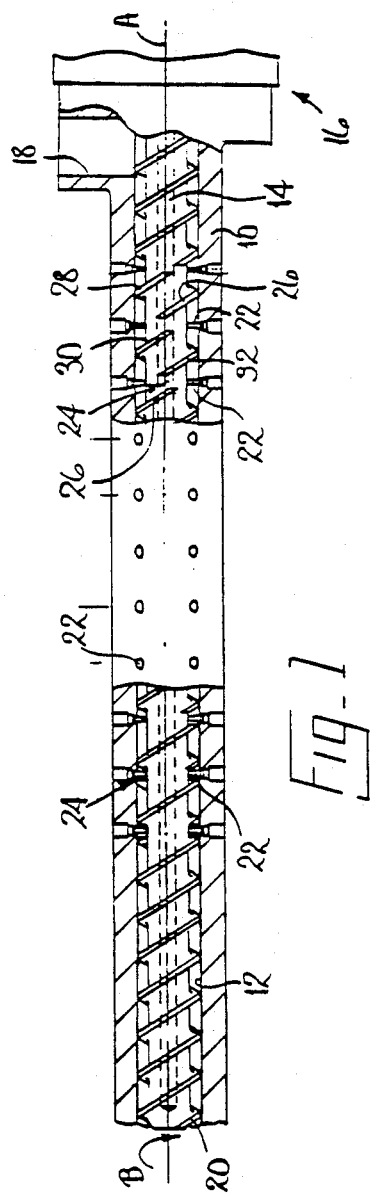
FIG. 1 is a view, partly in section and with parts broken away of a screw extruder embodying the invention.

The illustrative screw extruder comprises a barrel 10 in which is formed a cylindrical extrusion chamber 12 extending lenghwise through the barrel. An extruder screw 14 is mounted for rotation in the chamber 12 about an axis A. The screw 14 is arranged to be rotated in the operation of the machine by suitable drive gear 16 of known construction. Material to be processed is supplied to an inlet end portion of the chamber 12 of the extruder through a feed opening 18. Material is fed, by rotation of the screw 14 in the direction indicated by arrows B, along the extrusion chamber 12 and is discharged from the chamber 12 through an outlet opening (not shown) adjacent an outlet end portion 20 of the screw.

The extruder screw 14 comprises two flights 26,28 spaced apart to leave two channels of equal width therebetween; the flights 26,28 may be regarded as primary flights of the extruder. The flights 26,28 commence at the inlet end portion of the screw 14 and continue at the outlet end portion of the extruder. The illustrative screw extruder also comprises at least one set, namely ten sets, of projections in the form of pins 22 projecting from the barrel 10 towards the axis of rotation A of the screw 14. Each set of pins 22 consists of 6 pins equally spaced round the barrel 10 defining an annular zone 24 of the extrusion chamber interrupting flights 26,28 of the screw. At the opposite side of each of the annular zones 24 to the flights 26,28 are flights 30,32 which are displaced angularly relative to the flights 26,28 so that the screw flights 26,28 and 30,32 at either side of each of the annular zones 24 are staggered with respect to one another. The construction and arrangement is such that end portions of the flights 26,28 at one side of each annular zone 24 overlap end portions of adjacent flights 30,32 at the opposite side of the zone 24.

The flights 30,32 are equally spaced apart and displaced angularly relative to the flights 26,28 through an angle of 90° from the position which would have been occupied by the flights 26,28 were these to have been continued through the sections including the flights 30,32. This places the flights 30, 32 at substantially the centre of the channels between the flights 26,28 were these flights to have been continued through the section including flights 30, 32. Likewise, at the recommencement of the flights 26,28 downstream of the section including flights 30,32, the recommencement of the flights 26,28 will be at substantially the centre of the channels between the flights 30, 32 were these flights to have been continued downstream.

Although, in the illustrative extruder, the flights 26,28 can be considered as continuing throughout the whole length of the extruder, apart from the interruptions mentioned above, in extruders according to the invention, the flights at the outlet end portion 20 of the screw 14 may be angularly displaced from the position which the flights 26, 28 (starting at the inlet end portion of the screw) would occupy were they to be continued through the length of the screw. Likewise, the flights at a downstream side of each annular zone 24 may be angularly displaced through an angle other than 90° suitably between 65° and 115° from the position which would have been occupied were the flights at the upstream side of the annular zone to be continued downstream, although the preferred angular displacement is such as to position the downstream flights substantially at the centre of the channels between the upstream flights were these upstream flights to have been continued downstream of the appropriate annular zone.

Although, in the illustrative extruder, the screw comprises two flights along the whole of its length, the screw may comprise one or more sections, at one side or another of one of the annular zones 24, having three or four flights equally spaced apart and angularly displaced from the two flights at the other side of the appropriate annular zone 24.

Although the screw 14 of the illustrative extruder comprises two flights throughout the whole of its length extruders according to the invention may comprise three or four or even more flights or, in some circumstances only one screw flight, for the bulk of its length. Normally, in larger extruders, having screws of larger diameters, the larger the diameter the more flights are preferred in the main body portion of the screw at the inlet and outlet end portions; for example two flights are suitable for screws of the order of 50 to 150 mm diameter, three flights are preferred for screws of the order of 150 mm diameter upwards (2 or 3 flights of 150 mm) and four flights preferred for screws of the order of 200 mm diameter upwards. Where a screw comprises three flights at either side of a zone 24 the flights are suitably displaced angularly by about 60°, in a screw comprising four flights an angular displacement of about 45° is preferred an angular displacement of about 180° is preferred in a single flight screw: in all cases the downstream flights are positioned substantially centrally between the positions which the upstream flights would have occupied were they to have been continued downstream of the annular zone. The angular displacement may vary by up to about 28% from the preferred displacement, in which the operation of the extruder is best balanced. The larger diameter extruders have a greater material capacity and increasing the number of staggered flights ensures that the material is subjected to the same division and working as material in smaller diameter extruders with fewer flights. The screw of an extruder embodying the invention may comprise different numbers of flights at different parts of its length or the same number of flights along its whole length.

The ratio of length to diameter of the extruder screw and the lead of the flights at various parts of the screw together with the number of annular zones provided are selected according to the application for which it is desired to use the extruder. For example, a screw having a threaded portion of length of about 147 cm and outside diameter about 9 cm having a length to diameter ratio of about 16.5 to 1, and may suitably have eight to twelve, preferably 10 annular zones provided by sets of pegs. Five or more are annular zones 24 wherein the flights at either side of the anuular zones 24 are displaced angularly relative to one another as hereinbefore described and the remainder of the annular zones may be annular zones 25 in which the flights at either side of the annular zones 25 are aligned and not displaced angularly relative to one another. To stabilise feed it is also preferred to subject the material to a slight compression in the inlet end portion of the extruder before reaching the first annular zone, for example by changing the lead of the screw. Annular zones 24 and annular zones 25 may be disposed in any convenient relation and number dependent upon the processing to be carried out; of course, in screw extruders otherwise similar to the illustrative extruder, all of the annular zones may comprise annular zones 24 in which the flights at either side of the zone are displaced angularly relative to one another. It is preferred, where the screw comprises both annular zones 24 and annular zones 25, that an annular zone 25 is disposed closest to the inlet 18, preferably several annular zones 25 being first encountered by the material as it travels through the extruder so that the material is softened and partially processed before being subjected to the more severe action upon crossing the zones 24.

In the operation of the illustrative screw extruder the screw 14 is rotated in the chamber 12 relative to the barrel 10, by the drive gear 16 at a suitable speed in the directions indicated by the arrows B in the drawings. Material to be processed is supplied by suitable feed means (not shown) through the feed opening 18 into the extrusion chamber 12 at the inlet end portion thereof and the material supplied through the opening 18 is fed downstream (to the left viewing FIGS. 1 and 2) by rotation of the screw. On reaching the first of the annular zones 24 the flow of material along the channels between the flights 26,28 encounters the pins 22 of the first of the annular zones 24 which cause considerable turbulence and mixing of the materials. Furthermore, as the materials cross the annular zone 24 and encounter the staggered flights 30,32, the material in each of the channels between the flights 26,28 is caused to divide as it meets the edges 44 and enters the screw channels between the screws 30, 32 (which as will be appreciated are staggered relative to the channels upstream of the annular zone 24). The arrows C generally indicate flow of material along the channels between the flights 26,28 and 30,32. As can be seen from FIG. 2 the flows along the various channels are divided as material crosses each annular zone 24. Note that, in FIG. 2, the flights 26 and 32 are shown twice so that both of the channels between the flights 26,28 and 30,32 can be seen.

Figure 2:
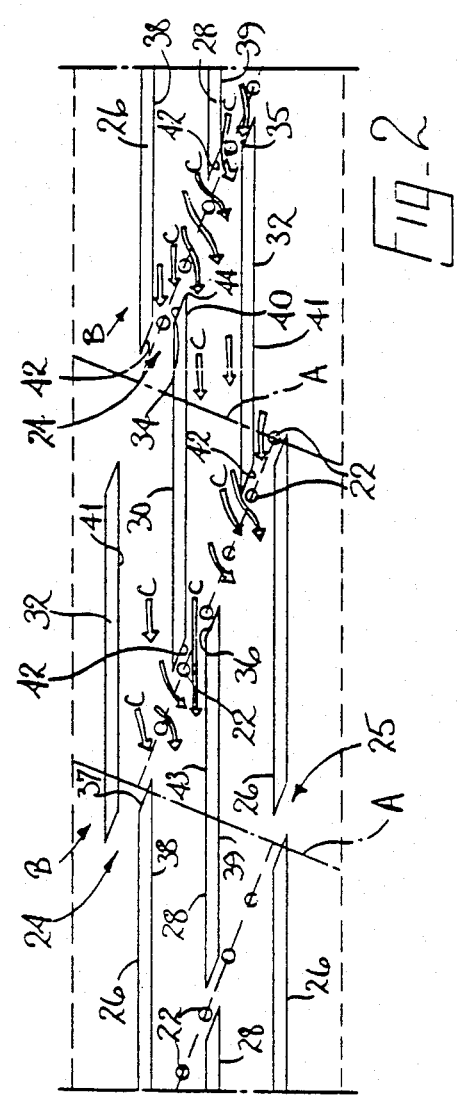
FIG. 2 is a development on to a flat plane of a screw of the extruder shown in FIG. 1 also showing sets of pins of the extruder.

As can be seen from FIG. 2 of the drawings, as material crosses one of the annular zones 24 it is forced through a converging gap formed between an upstream end face 34,35;36,37 of a flight at the downstream side of the annular zone 24 and a helical face 38,39;40,41 at the downstream end portion of the flight at the upstream side of the annular zone 24. The end faces 34,35,36,37 are aligned considered in a direction axially of the screw at least partially with a corresponding one of the helical main leading faces 38,39,40,41 of the screw flights. The pins 22 also pass between these converging gaps formed between the faces 34,38 and 35,39; 36,40 and 37,41 when passing through the converging gap around the pins 22 the material is subjected to considerable shearing action as well as the turbulence created by the pins 22. The amount of shear to which the material is subjected when passing through these converging gaps is dependent, inter alia, upon the amount of overlap between the upstream and downstream end portions of adjacent flights, the helix angle of the flights, the width of the annular zone and the dimensions of the pins 22. Although the pins 22 of the illustrative extruder are circular in cross-section, pins of different shapes may be used if desired. The upstream end face of the flights at the downstream side of each annular zone 24,25 e.g. the faces 34,35,36,37 lie in planes which are at right angles to the axis A of rotation of the screw 14 and which converge with the helical leading faces of the flights e.g. as can be seen from FIG. 2, the end face 34 converges with the helical leading face 40, the faces meeting in a sharp edge 44 which divides the flow as indicated by arrows C. The downstream ends of the flights at the upstream side of the annular zones 24,25 also each terminate in a face 42 inclined to the helical main trailing faces of the flight and which is at right angles to the axis A of rotation of the screw. The annular zones 24,25 can be regarded as being defined by the faces 34,42;35,42;36,42;37,42.

The number of pins in each set in a machine in accordance with the invention is chosen according to the degree of mixing which is desired of the particular material in question; normally, more pins are used in each set for the larger diameter screws than for the smaller ones. In the 147 cm screw described above 6 pins are preferred in each set.

In the operation of the illustrative extruder flow of material along the extruder screw across the annular zones 24 will increase multi-layering of the material, the pins 22 will increase turbulence and therefore improve mixing of the material and the pins 22 together with the converging faces 34,38;35,39;36,40;37,41, subject the material to shear. Because of the relative positioning of flights at either side of each annular zone 24 material which avoids being subjected to substantial shear by passing through a converging space between one of the end faces 34,35,36,37 and the corresponding leading face 38,39,40,41 will enter the channel at the downstream side of an annular zone 24 fairly close to the leading face 38,39,40,41 of the flight at the downstream side of the annular zone and will therefore have a high probability of being subjected to shear between the converging faces when approaching the next annular zone 24 downstream. On each stagger of flights across an annular zone 24, material close to the leading face of each flight 26,28,30,32 will, on passing through the annular zone 24 become situated close to the trailing face of the subsequent downstream flight thus improving uniformity of work done on the material, resulting in uniform temperature. For example material adjacent the leading face 40, upstream of a zone 24 will be close to the trailing face 43 of a flight at the downstream side of the zone 24. Material extruded by the illustrative screw extruder may be of improved quality having reduced temperature variations through the material and better homogeneity than materials processed in the previously known extruders.

I claim:

1. A screw extruder comprising a barrel having a chamber extending therethrough, a screw mounted for rotation in the chamber and comprising at least one helical flight defining a channel or channels between helical faces of a screw flight, at least one set of projections projecting from the barrel towards the axis of rotation of the screw into an annular zone of the chamber and interrupting the flight or flights of the screw, the flights at either side of the annular zone being disposed angularly relative to one another, the construction and arrangement being such that the end portions of adjacent flights at either side of the, or each, annular zone overlap one another when considered in a direction parallel with the screw axis, said flights terminating in end faces lying in planes substantially at right angles to the axis and the flights being displaced angularly relative to one another so that, considered in a direction longitudinally of the screw parallel with its axis, said end faces of adjacent flights do not face one another and are disposed at least partially opposite a helical face of a screw flight at the opposite side of the annular zone.

2. A screw extruder comprising a barrel having a chamber extending therethrough, a screw mounted for rotation in the chamber and comprising at least one helical flight defining a channel or channels between helical faces of a screw flight, at least one set of projections projecting from the barrel towards the axis of rotation of the screw into an annular zone of the chamber and interrupting the flight or flights of the screw, the flights at either side of the annular zone being displaced angularly relative to one another, round the axis of the screw, so that the screw flights at either side of the, or each, annular zone are staggered, the construction and arrangement being such that the end portions of adjacent flights at either side of the, or each, annular zone overlap one another when considered in a direction parallel with the screw axis and terminates in end faces lying in a plane substantially at right angles to the axis of rotation of the screw and said end faces of adjacent flights at either side of an annular zone are disposed so that they do not face one another, the faces being displaced angularly relative to one another round the axis of the screw so that, considered in a direction parallel with the screw axis, each end face is at least partially opposite a helical face of a screw flight at the opposite side of the annular zone.

* * * * *